United States Patent
Basaki et al.

(10) Patent No.: US 7,357,122 B2
(45) Date of Patent: Apr. 15, 2008

(54) INTERNAL COMBUSTION ENGINE CONTROL APPARATUS

(75) Inventors: Masatoshi Basaki, Nukata-gun (JP); Tatsushi Nakashima, Anjo (JP); Fumikazu Satou, Toyota (JP); Motoki Ohtani, Toyota (JP)

(73) Assignees: Nippon Soken, Inc., Nishio (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/319,927

(22) Filed: Dec. 29, 2005

(65) Prior Publication Data

US 2006/0150951 A1    Jul. 13, 2006

(30) Foreign Application Priority Data

Jan. 13, 2005    (JP)    ............................. 2005-006663

(51) Int. Cl.
*F02M 51/00*    (2006.01)

(52) U.S. Cl. .................. 123/478; 123/488; 123/90.15; 123/431; 701/104

(58) Field of Classification Search ............... 123/299, 123/431, 478, 488, 90.15; 701/104
See application file for complete search history.

(56) References Cited

U.S. PATENT DOCUMENTS

| | | | | |
|---|---|---|---|---|
| 6,561,157 B2* | 5/2003 | zur Loye et al. | ............ | 123/295 |
| 6,568,371 B2* | 5/2003 | Sato et al. | ............ | 123/478 |
| 6,971,364 B2* | 12/2005 | Pilgram et al. | ............. | 123/299 |

| | | | |
|---|---|---|---|
| 2003/0051707 A1 | | 3/2003 | Pilgram et al. |

FOREIGN PATENT DOCUMENTS

| | | |
|---|---|---|
| DE | 103 03 705 A1 | 8/2004 |
| JP | A 05-340285 | 12/1993 |
| JP | A 06-173746 | 6/1994 |
| JP | A 06-317209 | 11/1994 |
| JP | A 2003-129923 | 5/2003 |
| JP | A 2003-148177 | 5/2003 |
| JP | A 2004-245077 | 9/2004 |
| JP | A 2004-251155 | 9/2004 |

OTHER PUBLICATIONS

Japan Institute of Invention and Innovation Technology Report, No. 2003-500753, Pub. Date: Feb. 18, 2003.
Japan Institute of Invention and Innovation Technology Report, No. 2004-500804, Pub. Date: Feb. 10, 2004.
Japan Institute of Invention and Innovation Technology Report, No. 2004-506493, Pub. Date: Oct. 1, 2004.

* cited by examiner

*Primary Examiner*—Stephen K. Cronin
*Assistant Examiner*—J. Page Hufty
(74) *Attorney, Agent, or Firm*—Oliff & Berridge, PLC

(57) ABSTRACT

An engine ECU executes a program including the steps of: detecting an engine speed NE, a throttle angle THA and an amount of intake air GA; estimating an amount of intake air GAINI from the engine speed NE and the throttle angle THA; if the estimated amount of intake air GAINI minus the detected amount of intake air GA is larger than a predetermined deviation ΔGA(0) (YES at S104), then causing an intake manifold injector to inject fuel to clear a deposit, as controlled, at the exhaust stroke when an intake valve is closed and at the intake stroke when the intake valve is opened and an exhaust valve is closed.

16 Claims, 9 Drawing Sheets

INTERNAL COMBUSTION ENGINE CONTROL APPARATUS

This nonprovisional application is based on Japanese Patent Application No. 2005-006663 filed with the Japan Patent Office on Jan. 13, 2005, the entire contents of which are hereby incorporated by reference.

BACKGROUND OF THE INVENTION

1. Field of the Invention

The present invention relates generally to internal combustion engine control apparatuses and particularly to removing a deposit formed in an intake port.

2. Description of the Background Art

An internal combustion engine combusts an air fuel mixture in a cylinder to obtain power. The cylinder is provided with an intake valve and an exhaust valve. At the intake stroke when the intake valve opens, air (or an air fuel mixture) is introduced into the cylinder, and at the exhaust stroke when the exhaust valve opens, the air fuel mixture combusted (or exhaust gas) is exhausted external to the cylinder. To allow the internal combustion engine to efficiently introduce air into the cylinder, the intake valve is opened at the exhaust stroke slightly before the piston reaches the top dead center, when the exhaust gas can be blown back into an intake pipe. This causes a particulate matter present in the exhaust gas to be deposited at the intake port. This deposit must be removed.

Japanese Patent Laying-Open No. 2003-129923 discloses a fuel injection device capable of reducing and removing a deposit. As described in the publication, the fuel injection device includes a high pressure fuel pump, a controller, first injection valves, one for each cylinder of the internal combustion engine, and at least one second injection valve allowing fuel to be injected into an intake pipe.

As described in the publication, the fuel injection device allows fuel to temporarily be injected into the intake pipe through the second injection valve to contribute to a reduced deposit or remove a formed deposit.

How the fuel is sprayed in the intake port is influenced by how air flows in the intake port. The fuel injection device described in the publication, however, fails to consider how air flows in the intake port, and has a possibility of a reduced deposit removal effect.

SUMMARY OF THE INVENTION

The present invention contemplates an internal combustion engine control apparatus providing an improved deposit removal effect.

The present control apparatus controls an internal combustion engine at least having an intake manifold injection mechanism injecting fuel into an intake manifold. The present control apparatus includes a detector detecting information of a deposit formed in the intake manifold, and a controller controlling the intake manifold injection mechanism to inject the fuel when an intake valve is closed and the intake valve is opened if a predetermined condition associated with the deposit is satisfied.

In accordance with the present invention when the intake valve is closed and the intake valve is opened fuel is injected into the intake manifold. When the intake valve is closed, the intake manifold has a weak air flow therein. As such, the injected fuel can collide in the intake manifold around the intake valve over a large range to allow a deposit to be removed over the large range. When the intake valve is opened, the intake manifold has an intense air flow therein toward the cylinder. The air flow can carry the injected fuel and cause the fuel to forcefully collide against the intake manifold to remove the deposit sufficiently and hence more effectively.

Preferably the controller controls the intake manifold injection mechanism to exert control to inject the fuel during successive exhaust and intake strokes.

In accordance with the present invention the deposit can be removed during successive exhaust and intake strokes and hence rapidly.

Still preferably the controller controls the intake manifold injection mechanism to exert control to inject the fuel during exhaust and intake strokes.

In accordance with the present invention the deposit can be removed during exhaust and intake strokes and hence rapidly.

Still preferably the present control apparatus further includes a prohibiter prohibiting the intake manifold injection mechanism from injecting the fuel when the intake and exhaust valves open.

In accordance with the present invention while the valves both open, or overlap, the intake manifold can receive exhaust gas flowing back thereinto. As such, if fuel is injected with the valves overlapping, the injected fuel is pushed back and in the vicinity of the intake valve the deposit is removed less effectively. Accordingly, while the valves overlap, the intake manifold injection means is prohibited from injecting the fuel. Unnecessary fuel injection can thus be prevented.

Still preferably the internal combustion engine has an in-cylinder injection mechanism injecting the fuel into a cylinder.

In accordance with the present invention the cylinder can receive fuel directly injected thereinto. The cylinder's internal temperature can be decreased. This allows the cylinder to receive more air to combust an air fuel mixture more appropriately.

Still preferably the present control apparatus further includes a ratio modifier increasing a ratio of the fuel injected through the intake manifold injection mechanism if the predetermined condition associated with the deposit is satisfied.

In accordance with the present invention the deposit can be removed further more effectively.

Still preferably the intake manifold injection mechanism is an intake manifold injector and the in-cylinder injection mechanism is an in-cylinder injector.

In accordance with the present invention an internal combustion engine that is provided with in-cylinder and intake manifold injectors separately to bear shares, respectively, of injecting fuel can have a deposit removed therefrom.

Still preferably the information of the deposit is an amount of the deposit and the predetermined condition is that the amount of the deposit is larger than a predetermined amount.

In accordance with the present invention if a deposit has an amount larger than predetermined, injection is controlled to reduce and remove the deposit. This can prevent injection controlled more than required.

Still preferably the present control apparatus further includes an interrupter interrupting injection as controlled, if the injection as controlled reduces the amount of the deposit to be smaller than the predetermined amount.

In accordance with the present invention injection controlled more than required can be prevented.

Still preferably the present control apparatus further includes, a detector detecting an amount of air taken into the internal combustion engine, a detector detecting an angle of a throttle valve adjusting the amount of air taken into the internal combustion engine and an estimator estimating from the angle of the throttle valve an amount of air taken into the internal combustion engine, and the detector compares an amount of air detected and that of air estimated to detect the amount of the deposit.

In accordance with the present invention when the intake manifold has a deposit therein the intake manifold has a reduced area in cross section. This contributes to a reduced amount of air actually taken in. Accordingly, an amount of air estimated from an angle of the throttle valve can be compared with that of air as measured to detect the amount of the deposit.

Still preferably the information of the deposit is at least one of: an amount of blow-by gas inhaled into a cylinder from a crankcase of the internal combustion engine; an amount of exhaust gas returned into the cylinder; a load of the internal combustion engine; a pressure of air taken into the internal combustion engine; and a time with the intake valve and an exhaust valve both open.

In accordance with the present invention a parameter that can be a cause forming a deposit can be referred to determine whether injection should be controlled to remove the deposit. When a deposit can be formed in or assumed to be formed in the intake manifold, injection can be controlled to remove the deposit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
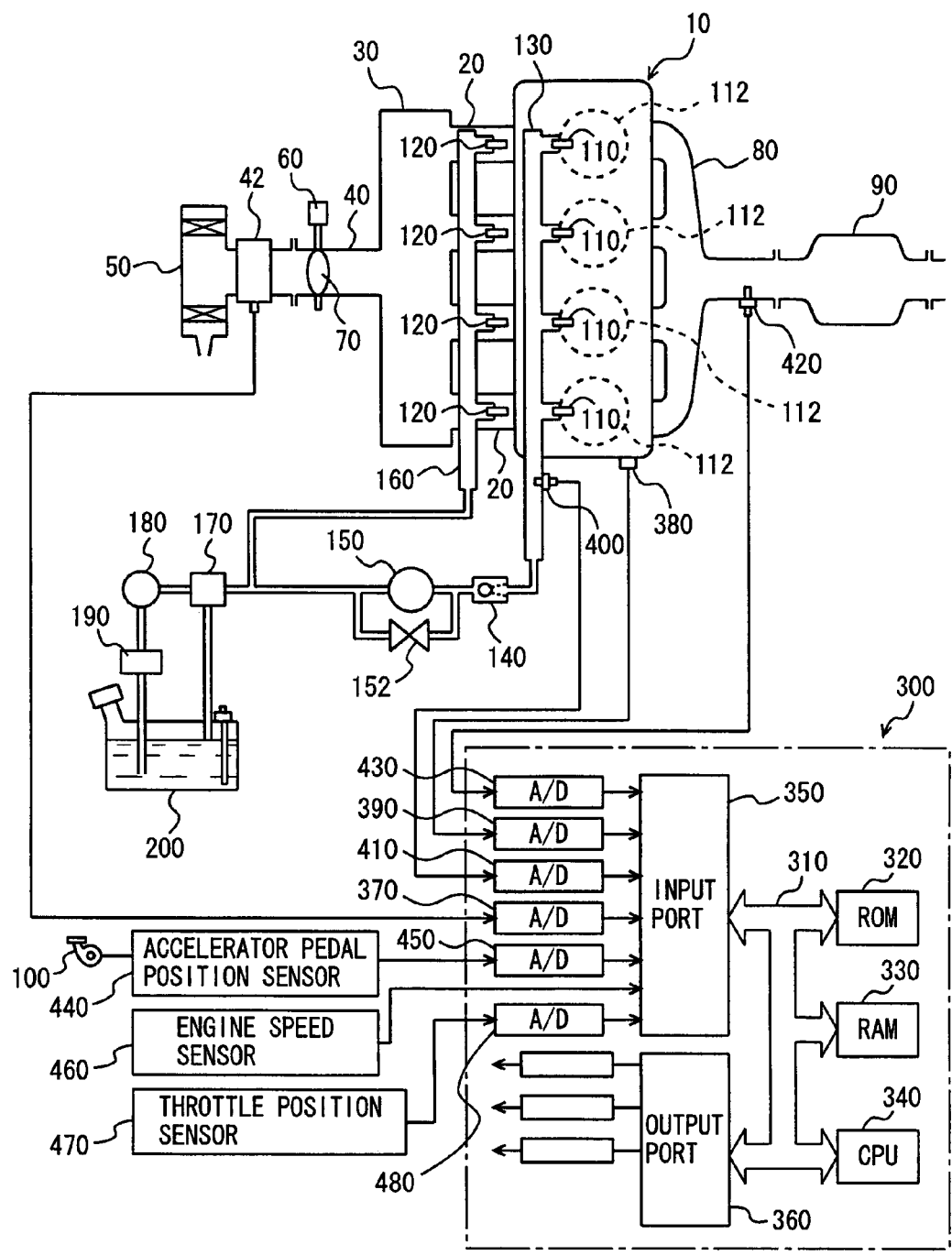
FIG. 1 is a (first) schematic configuration diagram of an engine system controlled by the present control apparatus in a first embodiment.

Hereinafter, embodiments of the present invention will be described with reference to the drawings. In the following description, the same parts have the same reference characters allotted and also have the same names and functions. Thus, detailed description thereof will not be repeated.

First Embodiment

FIG. 1 is a schematic configuration diagram of an engine system that is controlled by an engine ECU (Electronic Control Unit) implementing the control apparatus for an internal combustion engine according to a first embodiment of the present invention. In FIG. 1, an in-line 4-cylinder gasoline engine is shown, although the application of the present invention is not restricted to such an engine.

As shown in FIG. 1, the engine 10 includes four cylinders 112, each connected via a corresponding intake manifold 20 to a common surge tank 30. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its angle controlled in degree as based on a signal output from an engine ECU 300, independently from an accelerator pedal 100. Each cylinder 112 is connected to a common exhaust manifold 80, which is connected to a three-way catalytic converter 90.

Each cylinder 112 is provided with an in-cylinder injector 110 for injecting fuel into the cylinder and an intake manifold injector 120 for injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. In the present embodiment, an internal combustion engine having two injectors separately provided is explained, although the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is stopped. Electromagnetic spill valve 152 is controlled based on an output signal of engine ECU 300.

Each intake manifold injector 120 is connected to a common fuel delivery pipe 160 on a low pressure side. Fuel delivery pipe 160 and high-pressure fuel pump 150 are connected via a common fuel pressure regulator 170 to a low-pressure fuel pump 180 of an electric motor-driven type. Further, low-pressure fuel pump 180 is connected via a fuel filter 190 to a fuel tank 200. Fuel pressure regulator 170 is configured to return a part of the fuel discharged from low-pressure fuel pump 180 back to fuel tank 200 when the pressure of the fuel discharged from low-pressure fuel pump 180 is higher than a preset fuel pressure. This prevents both the pressure of the fuel supplied to intake manifold injector 120 and the pressure of the fuel supplied to high-pressure fuel pump 150 from becoming higher than the above-described preset fuel pressure.

Engine ECU 300 is implemented with a digital computer, and includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage is input via an A/D converter 370 to input port 350. A coolant temperature sensor 380 is attached to engine 10, and generates an output voltage proportional to a coolant temperature of the engine, which is input via an A/D converter 390 to input port 350.

A fuel pressure sensor 400 is attached to fuel delivery pipe 130, and generates an output voltage proportional to a fuel pressure within fuel delivery pipe 130, which is input via an A/D converter 410 to input port 350. An air-fuel ratio sensor 420 is attached to an exhaust manifold 80 located upstream of three-way catalytic converter 90. Air-fuel ratio sensor 420 generates an output voltage proportional to an oxygen concentration within the exhaust gas, which is input via an A/D converter 430 to input port 350.

Air-fuel ratio sensor 420 of the engine system of the present embodiment is a full-range air-fuel ratio sensor (linear air-fuel ratio sensor) that generates an output voltage proportional to the air-fuel ratio of the air-fuel mixture burned in engine 10. As air-fuel ratio sensor 420, an O2 sensor may be employed, which detects, in an on/off manner, whether the air-fuel ratio of the air-fuel mixture burned in engine 10 is rich or lean with respect to a theoretical air-fuel ratio.

Accelerator pedal 100 is connected with an accelerator pedal position sensor 440 that generates an output voltage proportional to the degree of press down of accelerator pedal 100, which is input via an A/D converter 450 to input port 350. Further, an engine speed sensor 460 generating an output pulse representing the engine speed is connected to input port 350. ROM 320 of engine ECU 300 prestores, in the form of a map, values of fuel injection quantity that are set in association with operation states based on the engine load factor and the engine speed obtained by the above-described accelerator pedal position sensor 440 and engine speed sensor 460, and correction values thereof set based on the engine coolant temperature.

Furthermore, the angle of throttle valve 70 (or a throttle angle) is detected by a throttle position sensor 470. Throttle position sensor 470 outputs a voltage which is in turn input via an A/D converter 480 to an input port 350.

Figure 2:
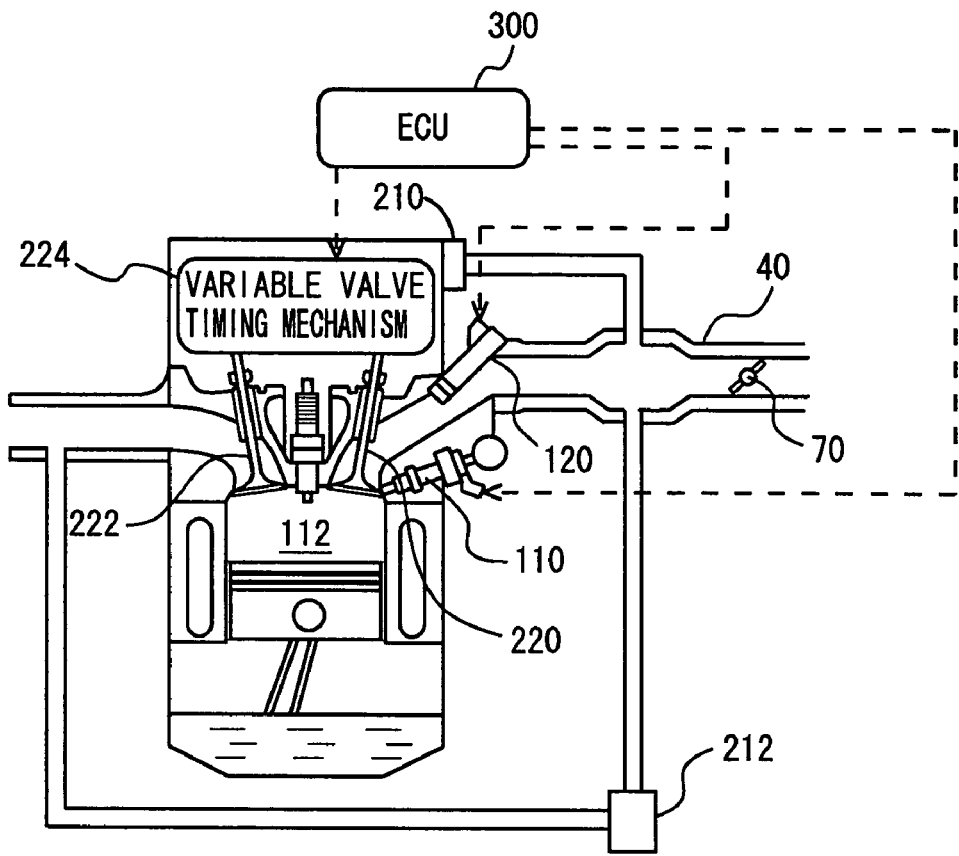
FIG. 2 is a (second) schematic configuration diagram of the engine system controlled by the present control apparatus in a second embodiment.

With reference to FIG. 2, engine 100 will further be described. Intake duct 40 receives blow-by gas returned through a positive crankcase ventilation (PCV) valve 210. Furthermore through an exhaust gas recirculation (EGR) valve 212 exhaust gas is partially returned.

The blow-by gas returned to intake duct 40 is controlled in amount by PCV valve 210 as based on an engine speed NE and a load of engine 10, and the like. Similarly, the exhaust gas returned to intake duct 40 is controlled in amount by EGR valve 212 as based on engine speed NE, a load of engine 10, and the like. The blow-by gas and exhaust gas returned to intake duct 40 may be determined in amount by well known general techniques.

Cylinder 112 has a top portion provided with an intake valve 220 and an exhaust valve 222. Intake and exhaust valves 220 and 222 are timed to open and close, as controlled by a variable valve timing mechanism 224 implemented by a cam and controlled by engine ECU 300. How intake and exhaust valves 220 and 222 are timed to open and close may be determined, i.e., variable valve timing mechanism 224 may be controlled, by known general techniques.

Figure 3:
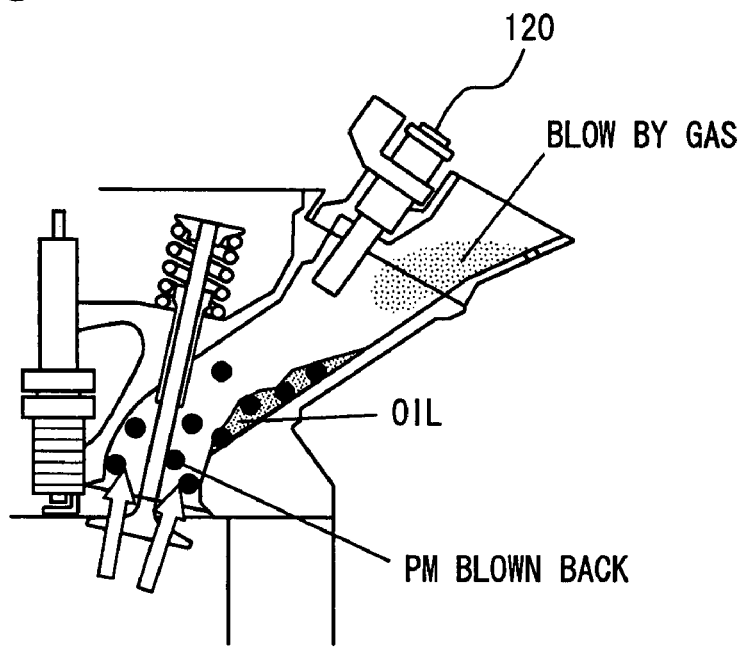
FIG. 3 shows a deposit formed.
Figure 4:
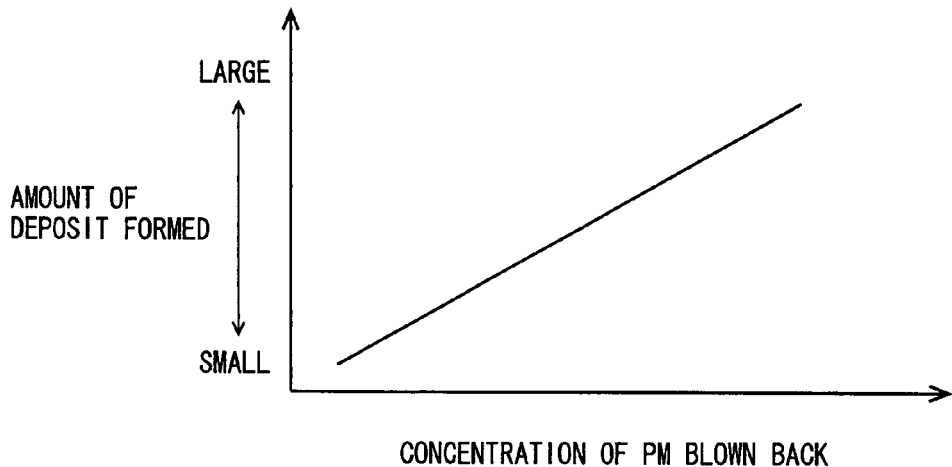
FIG. 4 represents a relationship between a concentration of a particulate matter blown back into an intake port and an amount of a deposit formed.

To efficiently introduce air into the cylinder, intake valve 220 can be opened slightly before the piston reaches the top dead center, when exhaust gas is blown back into the intake port, as shown in FIG. 3. When the exhaust gas is blown back into the intake port, oil in the blow-by gas returned into the intake port acts as a binder and a particulate matter present in the exhaust gas is thus deposited at the intake port. As shown in FIG. 4, higher levels in concentration of the particulate matter in the exhaust gas blown back provide the deposit in larger amounts. The present embodiment allows intake manifold injector 120 to inject fuel to allow a reduced deposit and remove a deposit formed.

Figure 5:
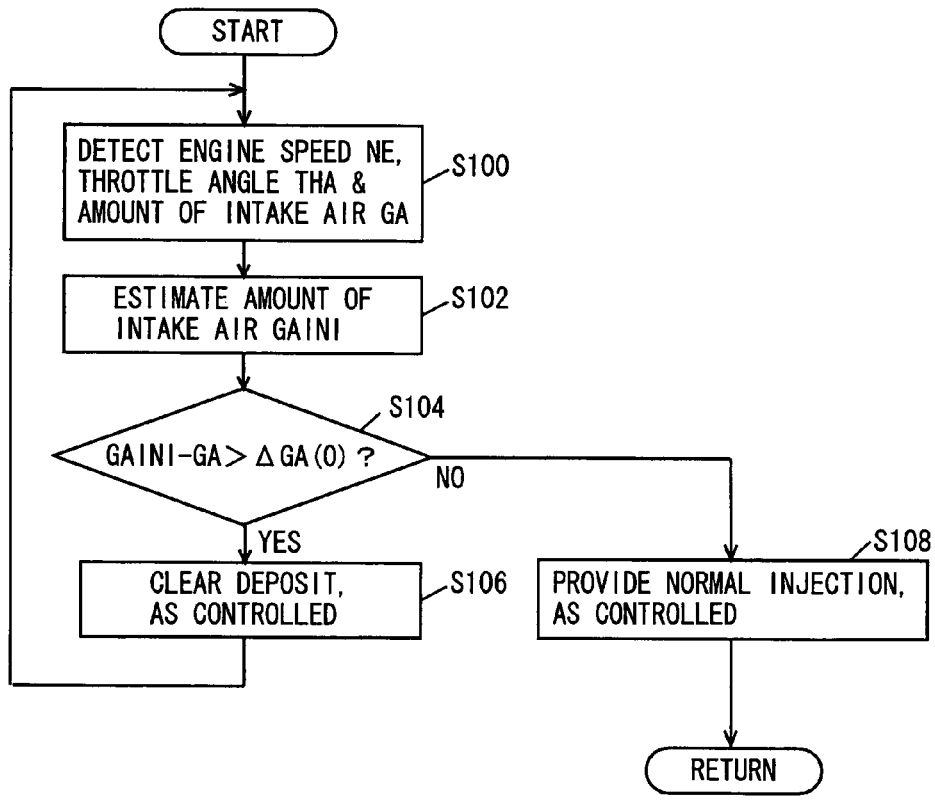
FIG. 5 is a flow chart of a program for control, as executed by an engine ECU corresponding to the present control apparatus in the first embodiment.

With reference to FIG. 5 the present invention in the present embodiment provides a control apparatus, or engine ECU 300, executing a program having a configuration for control, as described hereinafter.

At step (S) 100 engine ECU 300 operates in response to signals received from engine speed sensor 460, throttle position sensor 470 and air flow meter 42, respectively, to detect engine speed NE, a throttle angle THA and an amount of intake air GA, respectively.

At S102 engine ECU 300 estimates an amount of intake air GAINI from engine speed NE and throttle angle THA. The amount of intake air GAINI is estimated in accordance with a map stored in a memory (not shown).

At S104 engine ECU 300 determines whether the estimated amount of intake air GAINI minus the detected amount of intake air GA is larger than a predetermined deviation ΔGA(0). More specifically, the detected amount of intake air GA is compared with the estimated amount of intake air GAINI to indirectly determine whether the intake port has formed therein a deposit larger in amount than predetermined.

If amount GAINI minus amount GA is larger than deviation ΔGA(0) (YES at S104) the process proceeds to S106. Otherwise (NO at S104) the process proceeds to S108.

At S106 engine ECU 300 controls intake manifold injector 120 to inject fuel to clear a deposit at the exhaust stroke when intake valve 220 is closed and/or at the intake stroke when intake and exhaust valves 220 and 222 are opened and closed, respectively. This is done at successive exhaust and intake strokes. Subsequently the process returns to S100.

At S108 engine ECU 300 exerts control to provide normal injection. More specifically, at the exhaust stroke when intake and exhaust valves 220 and 222 are both opened (or overlap) and/or at the intake stroke intake and exhaust valves 220 and 222 are opened and closed, respectively, intake manifold injector 120 injects the fuel.

In accordance with the above described configuration and flow chart the present embodiment provides the control apparatus or engine ECU 300 operating as described hereinafter.

While engine 10 is in operation, engine speed NE, throttle angle THA and an amount of intake air GA are detected (S100) and from engine speed NE and throttle angle THA an amount of intake air GAINI is estimated (S102).

If the estimated amount of intake air GAINI minus the detected amount of intake air GA is larger than the predetermined deviation ΔGA(0) (YES at S104), the intake port is considered to have a deposit formed therein having an amount larger than predetermined and hence a reduced area in cross section.

Figure 6:
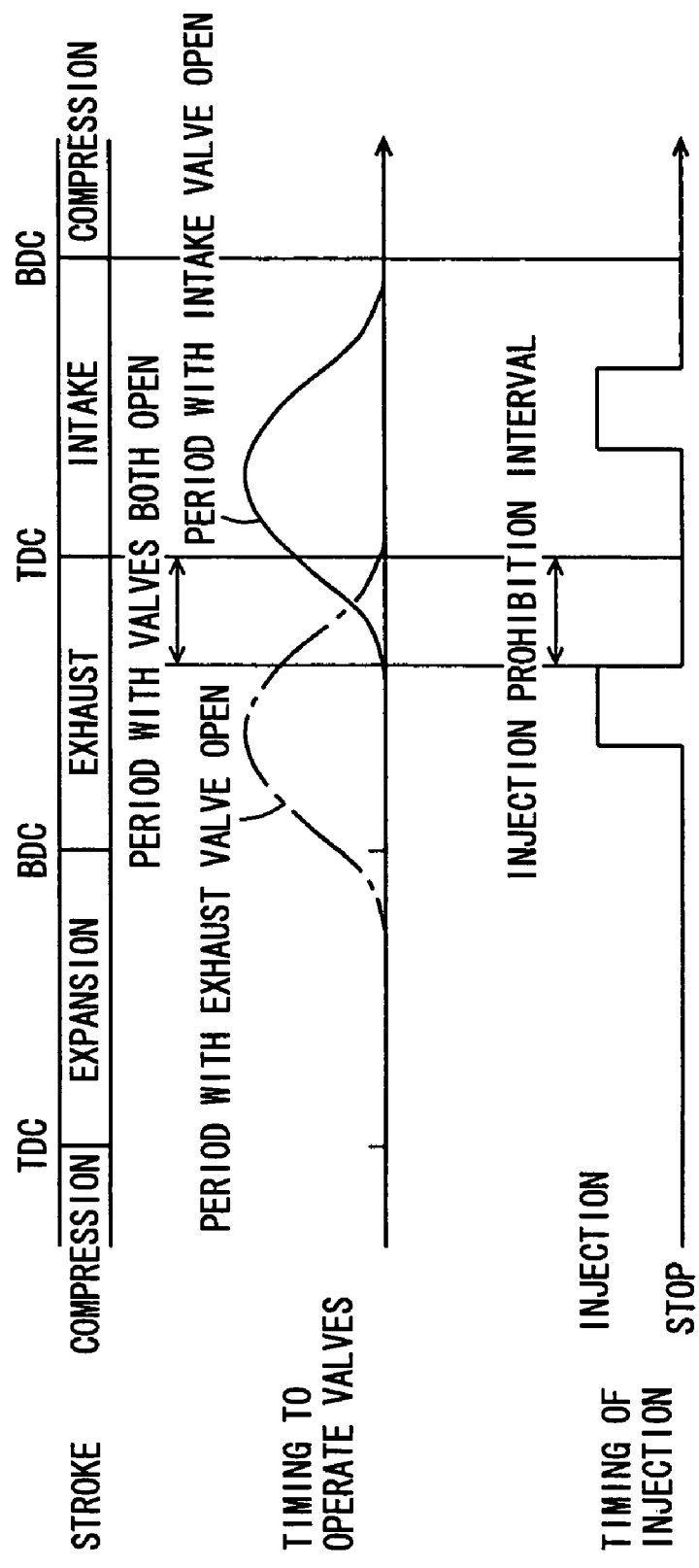
FIG. 6 represents a relationship between a timing to operate a valve and a timing of injection.

Accordingly, as indicated in FIG. 6 by a solid line, at the exhaust stroke when intake valve 220 is closed and at the intake stroke when intake and exhaust valves 220 and 222 are opened and closed, respectively, intake manifold injector 120 is controlled to inject the fuel to clear the deposit (S106).

Figure 7:
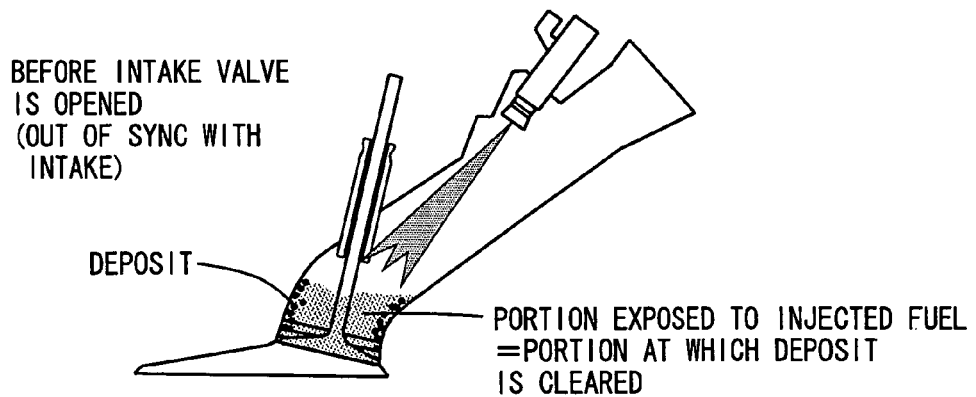
FIG. 7 shows fuel injected through an intake manifold injector with an intake valve closed.

At the exhaust stroke when intake valve 220 is closed and intake manifold injector 120 simultaneously injects the fuel, the injected fuel collides around intake valve 220 over a large area, as shown in FIG. 7. Thus the deposit is removed.

Figure 8:
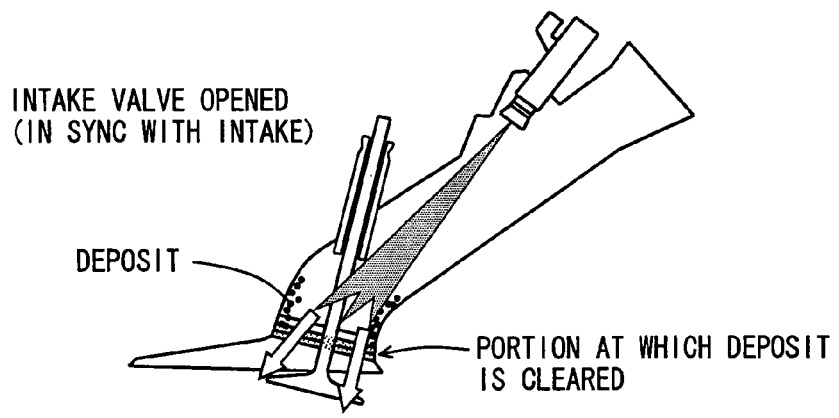
FIG. 8 shows fuel injected through the intake manifold injector with the intake valve open and an exhaust valve closed.

At the intake stroke when intake and exhaust valves 220 and 222 opens and closes, respectively, and intake manifold injector 120 simultaneously injects the fuel, the injected fuel is carried by an intake air flow and thus forcefully collides around a flared portion of intake valve 220, a valve seat of the intake port, and the like, as shown in FIG. 8. The deposit can be cleared more effectively.

Figure 9:
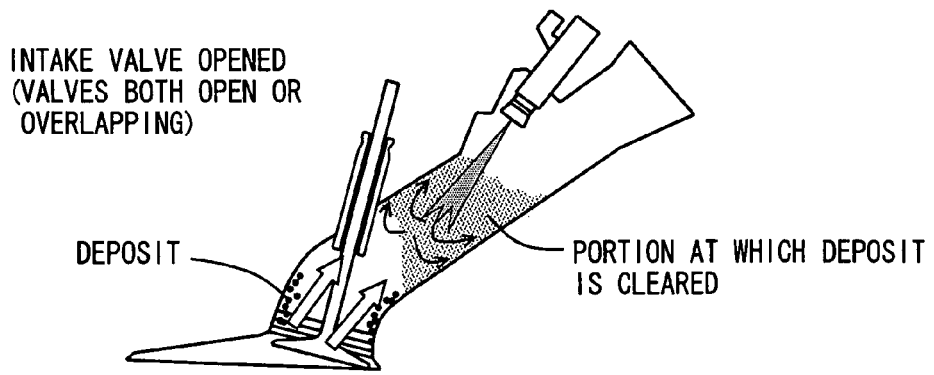
FIG. 9 shows fuel injected through the intake manifold injector with the intake and exhaust valves open.

If at the exhaust stroke with intake and exhaust valves 220 and 222 both opened (or overlapping) intake manifold injector 120 injects the fuel, then, as shown in FIG. 9, the injected fuel is pushed back upstream by exhaust gas blown back to the intake port. The fuel injected around the intake port fails to collide, and the deposit is cleared less effectively. Accordingly in the present embodiment while the valves are both open or overlap, intake manifold injector 120 is prohibited from injecting fuel. Note that if a deposit formed upstream of the intake port is removed, intake manifold injector 120 may be controlled to inject fuel while the valves are both open or overlap.

Figure 10:
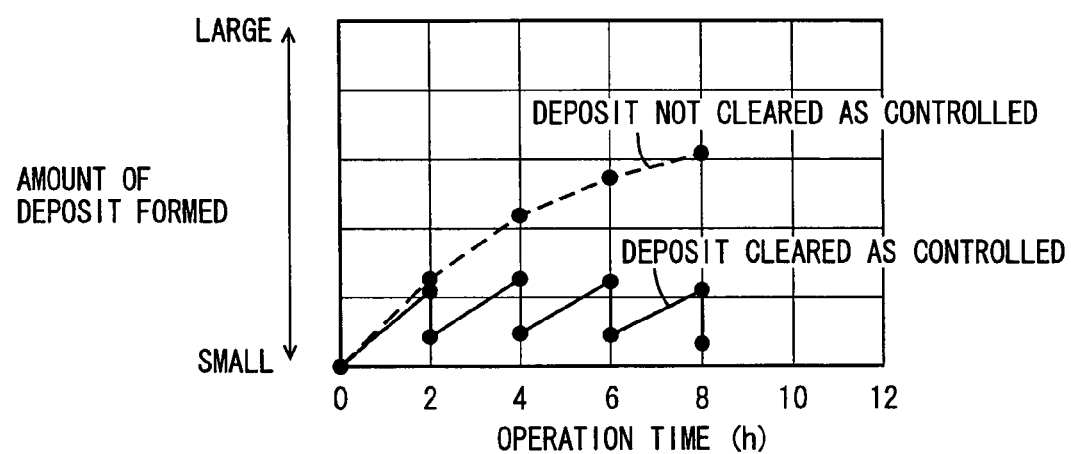
FIG. 10 represents how a deposit formed transitions in amount.

As indicated in FIG. 10 by a solid line, clearing a deposit, as controlled, allows a deposit having an amount smaller than otherwise (as indicated by a broken line). Cylinder 112 can have air efficiently introduced to prevent poor power and hence poor fuel economy.

When the deposit is cleared, as controlled, and accordingly removed and if the estimated amount of intake air GAINI minus the detected amount of intake air GA is not larger than deviation ΔGA(0) (NO at S104), clearing the deposit, as controlled, is interrupted, and normal injection is effected, as controlled (S108).

Thus the present embodiment provides a control apparatus or an engine ECU exerting control to clear a deposit when the deposit has an increased amount and the detected amount of intake air GA is smaller than the estimated amount of intake air GAINI. To do so, an intake manifold injector injects fuel at the exhaust stroke when an intake valve is closed and at the intake stroke when the intake valve is opened. This allows the injected fuel to collide against the intake port to contribute to a reduced deposit and remove a deposit formed.

Second Embodiment

Figure 11:
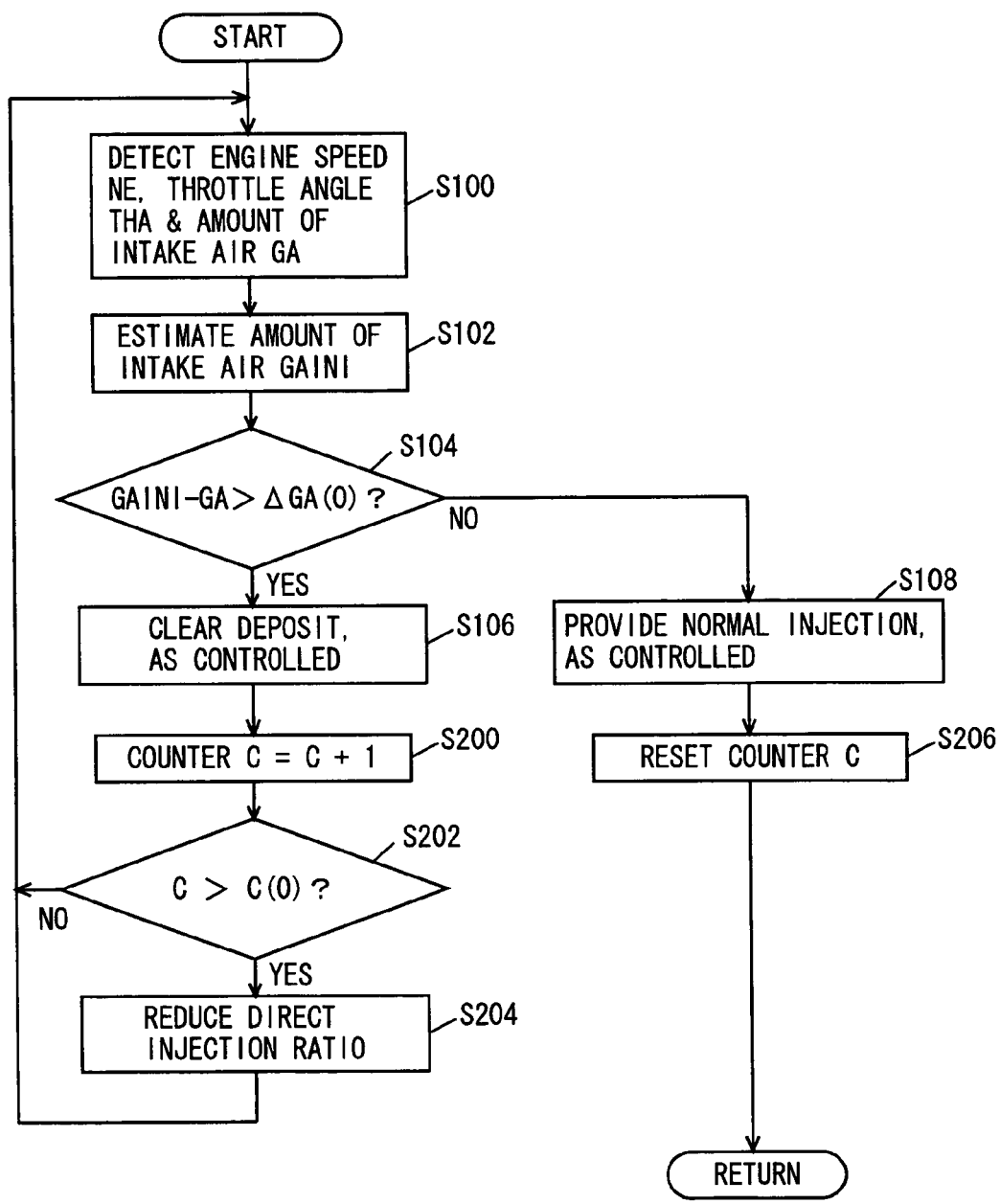
FIG. 11 is a flow chart of a program for control, as executed by an engine ECU corresponding to the present control apparatus in the second embodiment.

With reference to FIG. 11 the present invention in a second embodiment will be described. In the first embodiment a deposit is cleared, as controlled, and thus removed. In the present embodiment, in addition to clearing a deposit, as controlled, the intake manifold injector provides injection in an increased amount. The remainder is identical to that of the first embodiment. It is also identical in function.

With reference to FIG. 11, the present embodiment provides a control apparatus or engine ECU 300 executing a program having a configuration for control, as described hereinafter. Any steps identical to those of the program described in the first embodiment are identically labeled.

At S200 engine ECU 300 increments a counter C by one. By counter C engine ECU 300 indirectly counts a period of time having elapsed since a deposit was cleared, as controlled.

At S202 engine ECU 300 determines whether counter C is larger than a predetermined value C(0) to determine whether the period of time having elapsed since the deposit was cleared, as controlled, exceeds a predetermined time. If counter C is larger than C(0) (YES at S202) the process proceeds to S204. Otherwise (NO at S202) the process returns to S100.

At S204 engine ECU 300 reduces a direct injection ratio, which is a ratio of fuel injected through in-cylinder injector 110 in a total amount of fuel injected through in-cylinder and intake manifold injectors 110 and 120. More specifically, engine ECU 300 allows intake manifold injector 120 to provide injection in an increased amount. At S206 engine ECU 300 resets counter C.

In accordance with the above described configuration and flow chart the present embodiment provides a control apparatus or engine ECU 300 operating as described hereinafter.

In operation with in-cylinder and intake manifold injectors 110 and 120 injecting fuel, engine speed NE, throttle angle THA and an amount of intake air GA are detected (S100) and from engine speed NE and throttle angle THA an amount of intake air GAINI is estimated (S102).

If the estimated amount of intake air GAINI minus the detected amount of intake air GA is larger than the predetermined deviation ΔGA(0) (YES at S104), the intake port is considered to have a deposit formed therein having an amount larger than predetermined and hence a reduced area in cross section.

Accordingly, the deposit is cleared as controlled (S106) and counter C is incremented by one (S200). If counter C is not larger than C(0) (NO at S202) then it can be said that since the deposit was cleared, as controlled, a short period of time has elapsed. In that case, S100-S202 are repeated.

If counter C is larger than C(0) (YES at S202) then it can be said that since the deposit was cleared, as controlled, a long period of time has elapsed. In that case, the direct injection ratio is reduced (S204) to allow intake manifold injector 120 to provide injection in an increased amount to remove the deposit further more effectively.

The deposit has thus been removed and if the estimated amount of intake air GAINI minus the detected amount of intake air GA is not larger than the predetermined deviation ΔGA(0) (NO at S104) then normal injection is provided again as controlled (S108) and counter C is reset (S206).

Thus the present embodiment provides a control apparatus or an engine ECU reducing a direct injection ratio to allow an intake manifold injector to provide injection in an increase amount when counter C is larger than C(0), i.e., a period of time longer than a predetermined time has elapsed since a deposit was cleared as controlled. The deposit can be removed more effectively.

Third Embodiment

Figure 12:
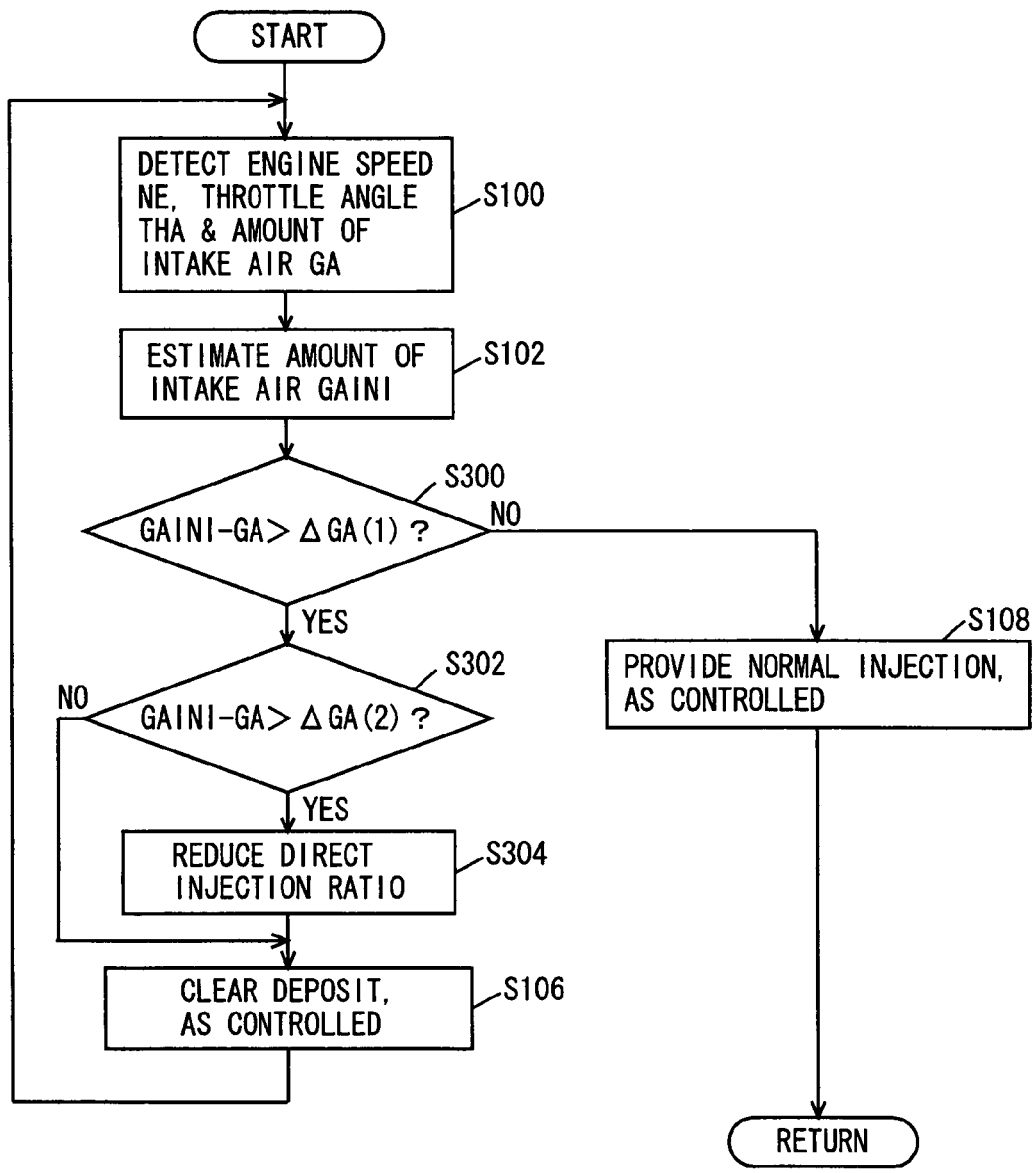
FIG. 12 is a flow chart of a program for control, as executed by an engine ECU corresponding to the present control apparatus in the second embodiment.

With reference to FIG. 12 the present invention in a third embodiment will be described. In the first embodiment a deposit is cleared, as controlled, and thus removed. In the present embodiment, in addition to clearing a deposit, as controlled, the intake manifold injector provides injection in an increased amount. The remainder is identical to that of the first embodiment. It is also identical in function.

With reference to FIG. 12, the present embodiment provides a control apparatus or engine ECU 300 executing a program having a configuration for control, as described hereinafter. Any steps identical to those of the program described in the first embodiment are identically labeled.

At S300 engine ECU 300 determines whether the estimated amount of intake air GAINI minus the detected amount of intake air GA is larger than a predetermined deviation ΔGA(1). If so (YES at S300) the process proceeds to S302. Otherwise (NO at S300) the process proceeds to S108.

At S302 engine ECU 300 determines whether the estimated amount of intake air GAINI minus the detected amount of intake air GA is larger than a predetermined deviation ΔGA(2). If so (YES at S302) the process proceeds to S304. Otherwise (NO at S302) the process proceeds to S106.

At S304 engine ECU 300 reduces a direct injection ratio, which is a ratio of fuel injected through in-cylinder injector 110 in a total amount of fuel injected through in-cylinder and intake manifold injectors 110 and 120. More specifically, engine ECU 300 allows intake manifold injector 120 to provide injection in an increased amount.

In accordance with the above described configuration and flow chart the present embodiment provides a control apparatus or engine ECU 300 operating as described hereinafter.

In operation with in-cylinder and intake manifold injectors 110 and intake manifold injector 120 injecting fuel, engine speed NE, throttle angle THA and an amount of intake air GA are detected (S100) and from engine speed NE and throttle angle THA an amount of intake air GAINI is estimated (S102).

If the estimated amount of intake air GAINI minus the detected amount of intake air GA is larger than ΔGA(1) (YES at S300), the intake port is considered to have a deposit formed therein having an amount larger than predetermined and hence a reduced area in cross section.

Furthermore, if the estimated amount of intake air GAINI minus the detected amount of intake air GA is also larger than ΔGA(2) (YES at S302), the intake port is considered to have a deposit formed therein having an excessive amount.

In that case the direct injection ratio is reduced (S304) and the deposit is cleared as controlled (S106). Thus the deposit can be removed more effectively and thus cleared as controlled.

In contrast, if the estimated amount of intake air GAINI minus the detected amount of intake air GA is not larger than ΔGA(2) (NO at S302), the intake port is not considered to have a deposit formed therein having an excessive amount. In that case, the direct injection ratio is not reduced and the deposit is cleared as controlled (S106).

The deposit has thus been removed and if the estimated amount of intake air GAINI minus the detected amount of intake air GA is not larger than ΔGA(1) (NO at S300) then normal injection is provided again as controlled (S108).

Thus the present embodiment provides a control apparatus or engine ECU exerting control to clear a deposit with a direct injection ratio reduced and an intake manifold injector providing injection in an increased amount if the estimated amount of intake air GAINI minus the detected amount of intake air GA is larger than ΔGA(2). In other words, the direction injection ratio is reduced depending on the amount of deposit formed. Thus the deposit can be removed more effectively.

Other Embodiment

In the first embodiment if the detected amount of intake air GA is smaller than the estimated amount of intake air GAINI, a deposit is cleared as controlled. Alternatively, if blow-by gas returned has an amount larger than predetermined, the deposit may be cleared as controlled. Furthermore, a time at which blow-by gas returned exceeds a predetermined amount, how frequently blow-by gas returned exceeds the predetermined amount, and/or the like may be accumulated and if the accumulation/accumulations exceeds/exceed a predetermined time, frequency and/or the like, the deposit may be cleared as controlled. Furthermore, blow-by gas returned may be accumulated in amount and if the accumulation exceeds a predetermined amount the deposit may be cleared as controlled.

Furthermore, if exhaust gas recirculation is provided in an amount larger than predetermined, the deposit may be cleared as controlled. Furthermore, a time at which exhaust gas recirculation is provided in an amount larger than predetermined, how frequently exhaust gas recirculation is so provided, and/or the like may be accumulated and if the accumulation/accumulations exceeds/exceed a predetermined time, frequency and/or the like, the deposit may be cleared as controlled. Furthermore, exhaust gas recirculation may be accumulated in amount and if the accumulation exceeds a predetermined amount the deposit may be cleared as controlled.

Furthermore, if a load of engine 10 is smaller than predetermined, i.e., intake pressure is lower than predetermined, the deposit may be cleared as controlled. Furthermore, a time at which the load of engine 10 is smaller than predetermined (or intake pressure is lower than predetermined), how frequently the load of engine 10 is smaller than predetermined, and/or the like may be accumulated and if the accumulation/accumulations exceeds/exceed a predetermined time, frequency and/or the like, the deposit may be cleared as controlled.

Furthermore, if intake and exhaust valves 220 and 222 overlap for a period of time longer than predetermined, the deposit may be cleared as controlled. Furthermore, a time at which the valves overlap for a period of time longer than predetermined, how frequently the valves so overlap, and/or the like may be accumulated and if the accumulation/accumulations exceeds/exceed a predetermined time, frequency and/or the like, the deposit may be cleared as controlled. Furthermore, valve overlap periods may be accumulated together and if the accumulation is larger than predetermined, the deposit may be cleared as controlled.

Furthermore, a time at which a predetermined condition for operation is established that is associated with an amount of blow-by gas returned, an amount of exhaust gas recirculation, the load of engine 10, intake air's pressure, the valve overlap period and the like, how many times such condition is established, and/or the like may be accumulated and if the accumulation/accumulations exceeds/exceed a predetermined time, frequency and/or the like, the deposit may be cleared as controlled.

Figure 13:
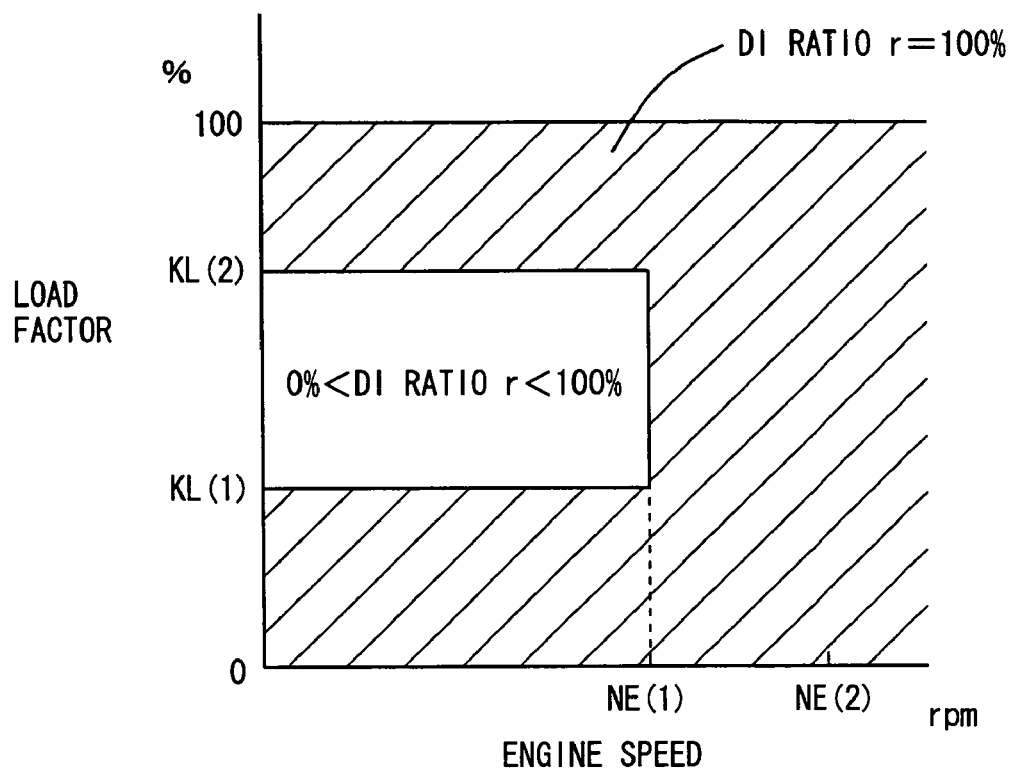
FIG. 13 is a DI ratio map of an engine suitable for applying the present control apparatus.

Engine Suitable for Applying the Present Control Apparatus Hereinafter will be described an engine suitable for applying the control apparatus of the present embodiment. With reference to FIG. 13, a map indicating a fuel injection ratio between in-cylinder injector 110 and intake manifold injector 120, identified as information associated with a state of operation of engine 10, will now be described. Herein, the fuel injection ratio between the two injectors will also be expressed as a ratio of the quantity of the fuel injected from in-cylinder injector 110 to the total quantity of the fuel injected, which is referred to as the "fuel injection ratio of in-cylinder injector 110", or, a "DI (Direct Injection) ratio (r)". The map is stored in ROM 320 of engine ECU 300.

In the map shown in FIG. 13, with the horizontal axis representing an engine speed of engine 10 and the vertical axis representing a load factor, the fuel injection ratio of in-cylinder injector 110, or the DI ratio r, is expressed in percentage. "DI RATIO r=100%" represents a range where in-cylinder injector 110 alone injects fuel, and "0%<DI RATIO r<100%" represents a range where in-cylinder and intake manifold injectors 110 and 120 bear shares, respectively, of injecting fuel.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine at least having an intake manifold injection mechanism injecting fuel into an intake manifold and an in-cylinder injection mechanism injecting the fuel into a cylinder which is provided with an intake valve and an exhaust valve, comprising:
   a detector detecting information of a deposit formed in said intake manifold;
   a controller controlling said intake manifold injection mechanism to inject the fuel when said intake valve is closed and when said intake valve is opened, if a predetermined condition associated with said deposit is satisfied;
   a modifier increasing an amount of the fuel injected through said intake manifold injection mechanism and decreasing an amount of the fuel injected through said in-cylinder injection mechanism, if said predetermined condition associated with said deposit is satisfied; and
   a prohibiter prohibiting said intake manifold injection mechanism from injecting the fuel when said intake and exhaust valves both open.

2. The control apparatus according to claim 1, wherein said controller controls said intake manifold injection mechanism to exert control to inject the fuel during successive exhaust and intake strokes.

3. The control apparatus according to claim 1, wherein said controller controls said intake manifold injection mechanism to exert control to inject the fuel during exhaust and intake strokes.

4. The control apparatus according to claim 1, wherein said intake manifold injection mechanism is an intake manifold injector and said in-cylinder injector mechanism is an in-cylinder injector.

5. The control apparatus according to claim 1, wherein:
   said information of said deposit is an amount of said deposit; and
   said predetermined condition is that said amount of said deposit is larger than a predetermined amount.

6. The control apparatus according to claim 5, further comprising an interrupter interrupting injection as controlled, if said injection as controlled reduces said amount of said deposits to be smaller than said predetermined amount.

7. The control apparatus according to claim 5, further comprising:
   an air detector detecting an amount of air taken into said internal combustion engine;
   an angle detector detecting an angle of a throttle valve adjusting said amount of air taken into said internal combustion engine; and
   an estimator estimating from said angle of said throttle valve an amount of air taken into said internal combustion engine, wherein
   said detector compares an amount of air detected and that of air estimated to detect said amount of said deposit.

8. The control apparatus according to claim 1, wherein said information of said deposit is at least one of: an amount of blow-by gas introduced into a cylinder from a crankcase of said internal combustion engine; an amount of exhaust gas returned into said cylinder; a load of said internal combustion engine; a pressure of air taken into said internal combustion engine, and a time with said intake valve and an exhaust valve both open.

9. A control apparatus for an internal combustion engine having intake manifold injection means for injecting fuel at least into an intake manifold and in-cylinder injection means for injecting the fuel into a cylinder which is provided with an intake valve and an exhaust valve, comprising:
   detector means for detecting information of a deposit formed in said intake manifold;
   control means for controlling said intake manifold injection means to inject the fuel when said intake valve is closed and when said intake valve is opened, if a predetermined condition associated with said deposit is satisfied;
   means for increasing an amount of the fuel injected through said intake manifold injection means and decreasing an amount of the fuel injected through said in-cylinder injection means, if said predetermined condition associated with said deposit is satisfied; and
   means for prohibiting said intake manifold injection means from injecting the fuel when said intake and exhaust valves both open.

10. The control apparatus according to claim 9, wherein said control means includes means for controlling said intake manifold injection means to exert control to inject the fuel during successive exhaust and intake strokes.

11. The control apparatus according to claim 9, wherein said control means includes means for controlling said intake manifold injection means to exert control to inject the fuel during exhaust and intake strokes.

12. The control apparatus according to claim 9, wherein said intake manifold injection means is an intake manifold injector and said in-cylinder injection means is an in-cylinder injection.

13. The control apparatus according to claim 9, wherein:
   said information of said deposit is an amount of said deposit; and
   said predetermined condition is that said amount of said deposit is larger than a predetermined amount.

14. The control apparatus according to claim 13, further comprising means for interrupting injection as controlled, if said injection as controlled reduces said amount of said deposit to be smaller than said predetermined amount.

15. The control apparatus according to claim 13, further comprising:
   means for detecting an amount of air taken into said internal combustion engine;
   means for detecting an angle of a throttle valve adjusting said amount of air taken into said internal combustion engine; and
   means for estimating from said angle of said throttle valve an amount of air taken into said internal combustion engine, wherein
   said detection means includes means comparing an amount of air detected and that of air estimated for detecting said amount of said deposit.

16. The control apparatus according to claim 9, wherein said information of said deposit is at least one of: an amount of blow-by gas introduced into a cylinder from a crankcase of said internal combustion engine; an amount of exhaust gas returned into said cylinder; a load of said internal combustion engine; a pressure of air taken into said internal combustion engine; and a time with said intake valve and an exhaust valve both open.

* * * * *